United States Patent [19]
Lichtenstein et al.

[11] Patent Number: 5,621,028
[45] Date of Patent: Apr. 15, 1997

[54] LIGHT-SCATTERING TRANSLUCENT POLYMETHACRYLATE MOLDED ARTICLES WITH GOOD RESISTANCE TO ELEVATED TEMPERATURE AND WEATHERING

[75] Inventors: Hans Lichtenstein, Reinheim; Silvia Ebert, Darmstadt, both of Germany

[73] Assignee: Roehm GmbH Chemische Fabrik, Darmstadt, Germany

[21] Appl. No.: 205,359

[22] Filed: Mar. 3, 1994

Related U.S. Application Data

[63] Continuation of Ser. No. 54,218, Apr. 30, 1993, abandoned.

[30] Foreign Application Priority Data

May 16, 1992 [DE] Germany .......................... 42 16 341.2

[51] Int. Cl.$^6$ .................... C08L 25/08; C08L 33/12
[52] U.S. Cl. .................. 524/91; 524/99; 524/359; 524/718; 524/720; 524/770; 525/305; 525/309
[58] Field of Search .................... 524/91, 99, 359, 524/718, 720, 770; 525/305, 309

[56] References Cited

U.S. PATENT DOCUMENTS

| | | |
|---|---|---|
| 3,883,617 | 5/1975 | Krieg et al. . |
| 3,914,338 | 10/1975 | Krieg et al. . |
| 4,876,311 | 10/1989 | Hennig et al. . |
| 4,986,932 | 1/1991 | Disteldorf et al. . |
| 5,004,785 | 4/1991 | Ida et al. . |

FOREIGN PATENT DOCUMENTS

| | | |
|---|---|---|
| 0300161 | 1/1989 | European Pat. Off. . |
| 2212345 | 7/1974 | France . |
| OS2146607 | 3/1972 | Germany . |
| 2225578C3 | 12/1973 | Germany . |
| 2264224C3 | 7/1974 | Germany . |

*Primary Examiner*—Irina S. Zemel
*Attorney, Agent, or Firm*—Oblon, Spivak, McClelland, Maier & Neustadt, P.C.

[57] ABSTRACT

The invention relates to light-scattering polymethacrylate resins with high heat- and weather resistance, which resins may optionally be colored with dyestuffs or pigments. The desirable properties are achieved by addition of a combination of:

particles which are light-scattering, and are crosslinked and contain phenyl groups;
UV protectants; and
radical scavengers.

The inventive polymethacrylate molded articles are advantageously employed in illumination technology.

19 Claims, No Drawings

LIGHT-SCATTERING TRANSLUCENT POLYMETHACRYLATE MOLDED ARTICLES WITH GOOD RESISTANCE TO ELEVATED TEMPERATURE AND WEATHERING

This is a continuation of application Ser. No. 08/054,218, filed on Apr. 30, 1993, now abandoned.

BACKGROUND OF THE INVENTION

1. Field of the Invention

The invention relates to polymethacrylate molded articles, with crosslinked polystyrene as a light-scattering agent to render them translucent (cloudy) rather than transparent.

2. Discussion of the Background

Glass substitutes based on methyl methacrylate (hereinafter, "methyl methacrylate glass materials") play an important role in the lighting industry and in the manufacture of light couples. For good room illumination it is necessary that the transparent or translucent fixture elements around the light sources, and dome elements, have fillers added to them which are not dissolved in the polymethyl methacrylate (PMMA) glass. The purpose of these fillers is to cloud the material and act as a scattering agent for through-transmitted light, while not greatly lessening the high light permeability of the material.

In addition to inorganic fillers, (e.g. barium sulfate), polystyrene has proved to be a particularly advantageous scattering agent, providing high scattering when employed as an additive. As described in DE 2,225,578 (U.S. Pat. No. 3,883,617) and DE 2,264,224 (U.S. Pat. No. 3,914,338), un-crosslinked polystyrene may be added to the monomer which is to be polymerized, which monomer is comprised essentially of methyl methacrylate. The polystyrene initially dissolves in the monomer, but separates out as the polymerization proceeds. It becomes finely and uniformly distributed, because polystyrene is insoluble in PMMA and the system forms two phases, comprising two respective incompatible polymers. Further processing of such polystyrene-clouded polymers, e.g. by injection molding or extruding, to mass produce molded or formed articles, has resulted in a quality degradation as to the light-scattering and light-permeability of the translucent material. This may be attributed to the formation of aggregates of the polystyrene particles, and to changes in the solubility and distribution of the polystyrene after it undergoes shear strain during processing in the PMMA matrix.

The disadvantages of this type can be alleviated according to the teaching of DE 2,146,607 and DE 2,264,224 if crosslinked polymers comprised essentially of styrene units are used. The crosslinked polystyrenes contain up to c. 5 wt. % of crosslinking agent.

According to DE 2,225,578, one can achieve the benefits of a crosslinked polymer clouding agent by using un-crosslinked polystyrene soluble in methyl methacrylate monomer, if the polystyrene also contains comonomer units which react to produce crosslinking at temperatures above 100° C., in particular during further processing of the organic glass materials.

U.S. Pat. Nos. 4,876,311 and 5,004,785 describe translucent (clouded) plastic elements, e.g. such elements based on methacrylate resins, wherein the clouding agent comprises beads or fine particles of crosslinked material comprised essentially of monomer units containing aromatic groups, e.g. styrene or phenyl methacrylate, wherewith the material also comprises (in the polymer molecule) up to 20 wt. % of crosslinking agents.

Polymethacrylate clouded by means of un-crosslinked polystyrene, e.g. PMMA in the form of plate or sheet known as acrylic glass plate or sheet, has optical properties quite different from those of pure (and colorless) PMMA, such as light scattering (desired) and decreased transmissivity (not desired). The properties of such clouded PMMA are further diminished by tempering and by the action of light and weather; this degradation shows up in measurements of yellow value and of transmissivity. Addition of UV-protection agents and weathering protection agents, alone, to PMMA containing (un-crosslinked) polystyrene does not substantially alleviate this degradation.

It is sought to devise a polymethacrylate composition containing polystyrene as a clouding agent, which composition has high heat- and weather resistance, and which retains such resistance when subjected to, e.g., thermal forming operations to form light-scattering PMMA molded articles, and under conditions of use of such articles in illumination engineering, particularly outdoors.

Surprisingly, it was found that PMMA molded articles containing polystyrene light-scattering particles have high heat- and weather resistance, and retain such resistance, if the polymethacrylate composition contains:

a) crosslinked polymer particles comprised of units of phenyl group-containing monomers, b) UV protection agents, and c) radical scavengers.

Substances which may be used as crosslinked polymer particles comprised of units of phenyl-group-containing monomers include, in particular, crosslinked polystyrene, and crosslinked polymers which are comprised of phenyl-group-containing monomers.

The inventive polymethacrylate compositions and molded articles produced therefrom may also be colored, wherewith suitable colorants and dyestuff pigments may be added for this purpose.

SUMMARY OF THE INVENTION

Accordingly, one object of this invention is to provide a novel light-scattering polymethacrylate resin with high heat- and weather resistance, the polymer matrix of which is comprised at least 80 wt. % of units of methyl methacrylate, and which may be colored with dyestuffs or pigments; characterized in that the resins contains:

a) light-scattering, crosslinked polymer particles comprised of phenyl-group-containing monomers, b) UV protectant agents, and c) radical scavengers.

DETAILED DESCRIPTION OF THE PREFERRED EMBODIMENTS

Light-scattering Polymer Particles

Phenyl-group-containing crosslinked polymer particles comprise, in particular, crosslinked polystyrene wherein crosslinking is provided by polyfunctional monomers in the amount of 3–30 wt. %, which crosslinking monomers are in particular divinylbenzene; or said particles comprise 3–30 wt. % of polyfunctional crosslinking monomers, e.g. divinylbenzene or ethylene glycol di(meth)acrylate, and 50–100 wt. % of at least one (meth)acrylate monomer containing a phenyl group, e.g. phenyl (meth)acrylate, benzyl (meth) acrylate, or 2-phenylethyl (meth)acrylate.

The polymer particles preferably are spherical in shape, i.e. the light-scattering particles are employed principally as microbeads in the inventive compositions. Their particle diameters are 1–20 μm. They are generally present in the amount of 0.05–10 wt. %, preferably 0.1–5 wt. %, particularly preferably 0.2–3 wt. %, based on the total weight of all components of the inventive polymethacrylate resin.

Light-scattering agents based on phenyl-group-containing crosslinked monomers which agents may be used according to the invention are described, e.g., in DE 3,528,165, or are available as commercial products. The firm Sekisui Plastics Co., Ltd., of Japan, offers crosslinked polystyrene in microbead form under the designation SBX, e.g. SBX-5 or SBX-20, where the number given specifies the mean particle size in microns. These products may be used as components of the combinations according to the invention.

UV Stabilizers and Radical Scavengers

In order to achieve long-term stabilization of the polymethacrylate compositions which have been rendered light-scattering by means of phenyl-group-containing crosslinked monomers, whereby, the compositions resist thermal degradation and aging (changes in physical and chemical properties), the compositions must also contain a UV-absorbing light protection agent, and stabilizer which act as a radical scavenger. As seen from Table 1 of the experimental section, it turns out, surprisingly, that each of the components must be present if the high heat-stability and weather resistance (measured by the yellow value, DIN 6167), and the transmissivity (DIN 5033) are to be preserved under the indicated stressing.

UV protective agents according to the invention are, for example, derivatives of benzophenone, wherewith the substituents, such as hydroxyl and/or alkoxy groups, are usually in the 2- and/or 4-position. Among such compounds are 2-hydroxy-4-n-octoxybenzophenone, 2,4-dihydroxybenzophenone, 2,2'-dihydroxy-4-methoxybenzophenone, 2,2', 4,4'-tetrahydroxybenzophenone, 2,2'-dihydroxy-4,4'-dimethoxybenzophenone, and 2-hydroxy-4-methoxybenzophenone. Also, substituted benzotriazoles are well suited as additives for UV protection according to the invention; this group includes in particular 2-(2-hydroxy-5-methylphenyl)-benzotriazole, 2-[2-hydroxy-3,5-di-(α,α-dimethylbenzyl)-phenyl]-benzotriazole, 2-(2-hydroxy-3,5-di-tert-butylphenyl)-benzotriazole, 2-(2-hydroxy-3,5-butyl-5-methylphenyl)-5-chlorobenzotriazole, 2-(2-hydroxy-3,5-di-tert-butylphenyl)-5-chlorobenzotriazole, 2-(2-hydroxy-3,5-di-tert-amylphenyl)-benzotriazole, 2-(2-hydroxy-5-tert-butylphenyl)-benzotriazole, 2-(2-hydroxy-3-sec-butyl-5-tert-butylphenyl)-benzotriazole, and 2-(2-hydroxy-5-tert-octylphenyl)-benzotriazole.

Other examples of UV-protective agents according to the invention are 2-cyano-3,3-diphenylacrylic acid ethyl ester, 2-ethoxy-2'-ethyloxalic acid bisanilide, 2-ethoxy-5-tert-butyl-2'-ethyloxalic acid bisanilide, and substituted benzoic acid phenyl esters.

The UV-protective agent may be present as a low molecular weight compound such as those listed above, in the polymethacrylate composition which is to be stabilized. UV-absorbing groups may also be bonded covalently in the matrix polymer molecules by means of copolymerization with polymerizable UV-absorbing compounds, e.g. acrylic, methacrylic, or allyl derivatives of benzophenone derivatives, or of benzotriazole derivatives.

The UV-protective agents (which may be in the form of mixtures of chemically disparate UV-protective agents) are generally present in the amount of 0.01–1 wt. %, preferably 0.01–0.5 wt. %, particularly preferably 0.02–0.2 wt. %, based on the total weight of all components of the inventive polymethacrylate resin. The UV-protective agents according the present invention may be made by known or conventional methods.

The radical scavengers present in the inventive polymethacrylate resins are sterically hindered amines which are known as HALSs (hindered amine light stabilizers). These are employed to inhibit aging processes in paints and plastics, particularly polyolefin plastics (1984 Kunststoffe, 74, 10:620–623 (1984); and Farbe+Lack, 96, 9:689–693 (1990)). The tetramethylpiperidine group present in the HALSs is responsible for their stabilizing action. This class of compounds in general may permissibly have the piperidine nitrogen unsubstituted, or substituted with alkyl or acyl groups. The sterically hindered amines do not absorb in the UV region. They scavenge radicals which form; the UV-absorbers cannot do this. Examples of HALSs (which may be employed individually or as mixtures) are: bis(2,2,6,6-tetramethyl-4-piperidyl) sebacate, 8-acetyl-3-dodecyl-7,7,9, 9-tetramethyl-1,3,8-triazaspiro(4,5)decane-2,5-dione, bis(2, 2,6,6-tetramethyl-4-piperidyl) succinate, poly(N-β-hydroxyethyl-2,2,6,6-tetramethyl-4-hydroxypiperidine) succinic acid ester, or bis(N-methyl-2,2,6,6-tetramethyl-4-piperidyl) sebacate.

The radical scavengers are employed in the inventive polymethacrylate resins in the amount of 0.01–1.5 wt. %, preferably 0.02–1 wt. %, particularly preferably 0.02–0.5 wt. %, based on the total weight of all of the components. The radical scavengers according to the present invention may be made by known or conventional methods.

Production of the Light-Scattering Polymers with High Resistance to Heat and Weather The light scattering agent is added to the matrix material of the inventive polymethacrylate resin in a state in which the agent can be distributed at least approximately homogeneously in the matrix material. As a rule one adds the scattering agent, preferably in bead or microbead form, to the monomer or prepolymer, along with the UV-protective agent and the radical scavenger.

The polymerization of the monomer or prepolymer may be particularly carried out by methods which are per se known, for example using polymerization chambers in which a forming operation is also performed on the material (see Vieweg, R., and Esser, F., eds., 1975, "Kunststoff-Handbuch", Vol. IX, entitled "Polymethacrylate" pub. Hanser Muenchen, pp. 15–22).

The area of applicability of the invention is not limited to acrylic glass materials, but is principally directed to light-scattering polymethacrylate molded articles which are resistant to heat and weather. The acrylic glass materials based on methyl methacrylate may contain only units of methyl methacrylate, however must contain at least 80 wt. % of units of methyl methacrylate, preferably at least 85 wt. %, more preferably at least 90 wt. %. The acrylic glass material based on methyl methacrylate may also be comprised of other comonomer units in the amount of from 0–20 wt. %, preferably 1–15 wt. %. One might mention as suitable monomers, for example other esters of (meth)acrylic acid, e.g., methyl acrylate, butyl acrylate, methyl α-chloroacrylate, and ethyl methacrylate; also, amides (optionally substituted) of (meth)acrylic acid, e.g., (meth)acrylamide and hydroxymethyl (meth)acrylamide; further, acrylonitrile, styrene and styrene derivatives such as methylstyrene, vinyl esters of carboxylic acids, e.g. vinyl acetate, etc. One might particularly note the presence of crosslinking monomers, such as 1,4-butanediol dimethacrylate, ethylene glycol dimethacrylate, triethylene glycol dimethacrylate, 2,2-dihydroxymethyl-1-butanol trimethacrylate; or allyl compounds such as, e.g., allyl methacrylate, triallyl cyanurate, or triallyl isocyanurate.

The invention may frequently find use with colored acrylic glass materials, where colorants must be added to the polymerization mixtures and/or to the prepolymers. Examples of suitable dyestuffs and pigments for this purpose are described in ViewegEsser, ibid., Vol. IX. The polymerization mixtures may also contain auxiliary materials which are per se known, such as plasticizers, fireproofing agents, etc. The suitable concentrations for these additives may be obtained from the state of the art.

The methods of manufacture of the inventive polymer composition may closely imitate the polymerization methods of the state of the art. For example, initially the colorant may be mixed into the monomer which also contains UV-protectant and/or radical scavenger, with the aid of an intense stirrer; or into a prepolymer which may contain the additives comprising UV-protectant and/or radical scavenger. Mixing is continued until a homogeneous dispersion is obtained. When a prepolymer is employed, preferably one first adds a dispersion of the dyestuff or pigment and then one stirs in the above-described scattering agent, with homogeneous distribution of said agent by stirring. The subsequent procedure is a customary one, with, e.g., application of a vacuum and the charging of the mixture into a polymerization chamber. (See Rauch-Puntigam, H., and Voelker, Th., 1967, "Acryl- und Methacrylverbindungen".)

Peroxide or azo compounds in the usual amounts may be employed as initiators for the polymerization of the given monomers, the methyl methacrylate, and other monomers present, which other monomers may be, e.g., acrylic monomers, styrene and derivatives, or esters of vinyl compounds. The initiator concentration employed is 0.01–1.0 wt. %. Other radical polymerization initiators are possible as described in Kirk-Othmer Encyclopedia of Chemical Technology 3rd Ed., v13, p355–371.

To control the molecular weight, the known regulators in the per se known concentrations are suitable. Of these, one might mention, e.g., organic sulfur compounds. The degree of polymerization and thereby the molecular weight of the polymer produced may be regulated by the concentration of the initiator and/or of the regulator, in known fashion. The means of control of temperature must make allowance for the heat of polymerization which is liberated, and will also depend on the thickness of the sheet or plate being produced. Generally, the first phase of the polymerization is carried out in a heating medium (e.g. water bath) at relatively low temperature for a relatively long time (c. 3–18 hr), and then a phase of polymerization to completion (tempering) is carried out at a higher temperature (c. 80°–120° C.) for a relatively short time.

When methyl methacrylate is used as a monomer along with a prepolymer, a first phase of polymerization may be carried out at a water bath temperature of 40°–60° C., preferably c. 45° C., for c. 3–10 hr, followed by "tempering" c. 2–5 hr, preferably c. 3 hr, at c. 115° C. in a drying cabinet.

The resistance to heat and weather was determined by determining the yellow value and the transmissivity of the samples after "tempering" 30 min at 180° C., and by XENOTEST® testing:

Yellow value: DIN 6167, "Lichtart D65/10° Beobachter".

Transmissivity: DIN 5033, "Lichtart D65/10° Beobachter".

XENOTEST® test: DIN 53 387.

The inventive light-scattering polymethacrylate resins are produced by known methods, in the form of thermoplastic molding compounds, or preferably in the form of so-called "pour cast thermoelastic polymer material".

The molding compound is then used to produce molded articles for the illumination industry, by injection molding or extrusion. The polymethacrylate resin contained in the molding compound is present in molecular weights (Mn) in the range of 50,000 to c. 200,000 Dalton.

The preferred pour cast polymethacrylate resin, usually manufactured as sheet or plate, is further processed by thermal re-forming methods, e.g. bending and deep drawing, to produce illumination products. The molecular weights (Mn) of the resin are above 200,000 Dalton, preferably above 500,000 Dalton, particularly preferably above 1,000,000 Dalton.

Having generally described this invention, a further understanding can be obtained by reference to certain specific examples which are provided herein for purposes of illustration only and are not intended to be limiting unless otherwise specified.

EXAMPLES:

Comparative Example 1

Reaction mixture:

1000 parts methyl methacrylate prepolymer (viscosity c. 1000 cP, determined with a rotational viscosimeter according to DIN 53 019);

1 part 2,2'-azobis(isobutyronitrile);

10 parts crosslinked polystyrene microbeads with mean particle diameter 6 μm.

The reaction mixture was stirred intensively, charged into a silicate glass chamber with plate mold spacing 3 mm, and polymerized 15 hr at 45° C. in a water bath. The final polymerization was carried out in a tempering cabinet at 120° C.

After cooling and removing from the mold, a white, translucent acrylic glass-substitute plate was obtained which had high light-scattering characteristics. This composition lacks a UV-absorber and a radical scavenger.

Comparative Example 2

The procedure was as in Example 1, except that 0.5 parts of the UV-absorber 2-(2-hydroxy-5-methylphenyl)-benzotriazole was also added to the reaction mixture. This composition lacks a radical scavenger.

Example 3

The procedure was as in Example 1, except that 0.5 parts of the UV-absorber 2-(2-hydroxy-5-methylphenyl)-benzotriazole and 0.5 parts of the HALS product bis(2,2,6,6-tetramethyl-4-piperidyl) sebacate were also added to the reaction mixture.

Comparative Example 4

Reaction mixture:

1000 parts methyl methacrylate;

1 part 2,2'-azobis(isobutyronitrile);

10 parts of a polystyrene with mean molecular weight c. 230,000 g/mol, determined by size exclusion chromatography (SEC) on a high pressure liquid chromatography (HPLC) apparatus;

0.5 parts 2-(2-hydroxy-5-methylphenyl)-benzotriazole.

The reaction mixture was intensively stirred until the polystyrene was completely dissolved, the reaction mixture was then charged to a silicate glass chamber with plate mold spacing 3 mm, and polymerized 15 hr at 45° C. in a water bath. The final polymerization was carried out in a tempering cabinet at 120° C.

After cooling and removing from the mold, a white, translucent acrylic glass-substitute plate was obtained which had high light-scattering characteristics. This composition lacks a radical scavenger.

Example 5

The procedure was as in Example 4, except that 0.5 parts of the HALS product bis(2,2,6,6-tetramethyl-4-piperidyl) sebacate was also added to the reaction mixture.

TESTS FOR LIGHT STABILITY, WEATHER RESISTANCE, AND HEAT RESISTANCE

Light Stability and Weather Resistance 5000 hr XENOTEST® according to DIN 53 387.

Illumination:

102 min dry, at c. 65% relative humidity;

18 min artificial rain, at c. 90–100 rel. hum. and 40°–55° C.

Heat Resistance

The samples were heated 30 min at an oven temperature of 180° C.

Measurement and Evaluation

The measurement of transmissivity was carried out with a spectrophotometer in the range 380–780 nm, according to DIN 5033.

The yellow value was determined from spectral measurement according to DIN 6167.

The results of the measurements are presented in Table 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A light-scattering polymethacrylate resin with high heat and weather resistance, comprising:
    (a) a polymer matrix comprising at least 80 weight % of units of methyl methacrylate;
    (b) light-scattering crosslinked polymer particles consisting essentially of ethylenically unsaturated phenyl-group-containing monomers, which are formed prior to addition to the polymer matrix;
    (c) a UV protecting agent; and
    (d) a radical scavenger.

2. The light-scattering polymethacrylate resin according to claim 1; wherein said crosslinked polymer particles are in bead form, with a particle diameter of 1–20 µm.

3. The light-scattering polymethacrylate resin according to claims 1 or 2; wherein said UV protectant comprises UV-absorbers based on benzophenone and/or benzotriazole.

4. The light-scattering polymethacrylate resin according to claims 1 or 2; wherein said radical scavenger comprises a sterically hindered amine compound with a tetramethylpiperidine group.

5. The light-scattering polymethacrylate resin according to claims 1 or 2: wherein said light-scattering ethylenically-unsaturated phenyl-group-containing polymer particles are present in the resin composition in an amount of 0.05–10 wt. %; said UV protectant is present in an amount of 0.01–1 wt. %, and said radical scavenger is present in an amount of 0.01–1.5 wt. %.

6. The light-scattering polymethacrylate resin according to claims 1 or 2; further comprising dyestuffs and/or pigments.

7. The light-scattering polymethacrylate resin according to claims 1 or 2; wherein said resin has a molecular weight Mn in the range 50,000 to about 200,000 Dalton.

8. The light-scattering polymethacrylate resin according to claims 1 or 2; wherein said resin is a pour-cast thermoelastic material with a molecular weight (Mn) above 200,000 Dalton.

9. The light-scattering polymethacrylate resin according to claims 1 or 2; wherein said radical scavenger is selected from the group consisting of bis(2,2,6,6-tetramethyl-4-piperidyl) sebacate, 8-acetyl-3-dodecyl-7,7,9,9-tetramethyl-1,3,8-triazaspiro(4,5)decane-2,5-dione, bis(2,2,6,6-tetram-

TABLE 1

| Product according to (Example no.) | Yellow Value | | | Transmissivity | | | |
| --- | --- | --- | --- | --- | --- | --- | --- |
| | Before Testing | Following "tempering" 30 min at 180° C. | Following 5000 hr XENOTEST ® | Before Testing | Following "tempering" 30 min at 180° C. | Following 5000 hr XENOTEST ® | Δ Transmissivity following XENOTEST ® |
| Comp Ex. 1 | 8.64 | 9.57 | 9.78 | 80.0 | 78.4 | 72.2 | −7.0 |
| Comp Ex. 2 | 8.67 | 9.09 | 9.13 | 79.7 | 79.2 | 74.1 | −5.6 |
| Ex. 3 | 8.59 | 8.65 | 8.62 | 80.0 | 80.1 | 79.8 | −0.2 |
| Comp Ex. 4 | 10.02 | 21.03 | 9.43 | 78.0 | 65.6 | 73.5 | −4.5 |
| Ex. 5 | 10.72 | 19.24 | 10.54 | 76.8 | 65.10 | 73.5 | −3.3 | ethyl-4-piperidyl) succinate, Poly(N-β-hydroxyethyl-2,2,6,6-tetramethyl-4-hydroxypiperidine) succinic acid ester, bis(N-methyl-2,2,6,6-tetramethyl-4-piperidyl) sebacate and a mixture thereof.

10. A molded article of the light-scattering polymethacrylate resin of claims 1 or 2.

11. The light scattering polymethacrylate resin according to claim 8, wherein said pour-cast thermoelastic material has a molecular weight above 500,000 Dalton.

12. The light scattering polymethacrylate resin according to claim 8, wherein said pour-cast thermoelastic material has a molecular weight above 1,000,000 Dalton.

13. The light-scattering polymethacrylate resin according to claim 1, wherein said light-scattering crosslinked polymer particles consist essentially of polystyrene crosslinked by 3–30 wt. % polyfunctional crosslinking comonomers.

14. The light-scattering polymethacrylate resin according to claim 1, wherein said light-scattering crosslinked polymer particles consist essentially of 3–30 wt. % polyfunctional crosslinking monomers and 50–100 wt. % of at least one (meth)acrylate monomer containing a phenyl group.

15. The light-scattering polymethacrylate resin according to claim 14, wherein said (meth)acrylate monomer containing a phenyl group is selected from the group consisting of phenyl(meth)acrylate, benzyl(meth)acrylate and 2-phenylethyl(meth)acrylate.

16. The light-scattering polymethacrylate resin according to claim 1, wherein said light-scattering phenyl group-containing polymer particles are present in said resin composition in an amount of 0.05–10 wt. %, said UV protectant is present in an amount of 0.01–1 wt. %, and said radical scavenger is present in an amount of 0.01–15 wt %, and wherein the change in transmissivity after 5000 hours testing according to DIN 53 387 is –3.3 or less.

17. The light-scattering polymethacrylate resin according to claim 16, wherein said change in transmissivity is –0.2 or less.

18. The light-scattering polymethacrylate resin according to claim 16, wherein said light-scattering crosslinked polymer particles consist essentially of polystyrene crosslinked by 3–30 wt. % polyfunctional crosslinking comonomers.

19. A light-scattering polymethacrylate resin with high heat and weather resistance, comprising:

(a) a polymer matrix comprising at least 80 weight % of units of methyl methacrylate;

(b) light-scattering ethylenically unsaturated phenyl-group-containing polymer particles which consist essentially of preformed polystyrene particles crosslinked with polyfunctional ethylenically unsaturated monomers;

(c) a UV protecting agent; and (d) a radical scavenger.

* * * * *